May 18, 1937.　　　A. M. WATSON　　　2,081,078

BAKING AND COOKING UTENSIL

Filed April 24, 1935

INVENTOR.
Alice M. Watson
BY
John E. Baup.
ATTORNEY.

Patented May 18, 1937

2,081,078

UNITED STATES PATENT OFFICE 2,081,078

BAKING AND COOKING UTENSIL

Alice M. Watson, Milwaukee, Wis.

Application April 24, 1935, Serial No. 18,049

3 Claims. (Cl. 53—6)

My invention relates to baking and cooking utensils such as bread pans or the like.

The object of my invention is to provide a utensil that may be partitioned off at will separating it into two or more compartments for the convenience of the user.

It is manifest to persons familiar with the culinary art that at times it is desirable to bake or cook two or more varieties of food, either bread, cake, vegetable, or the like, at one time. This can be easily accomplished by the use of the device described and referred to as my invention.

Another distinct advantage for the use of the device is to afford a means of preparing individual portions if desired.

Figure 1:
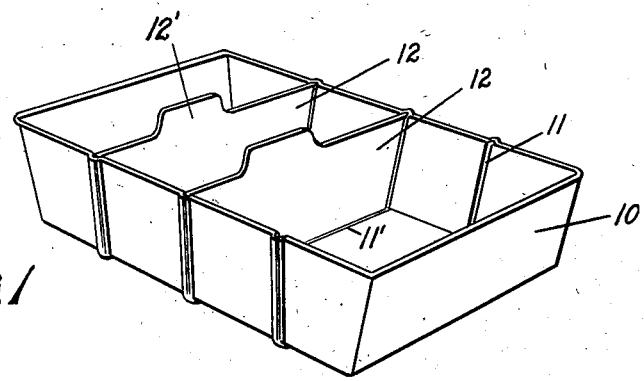

Other and further objects of my invention will become readily apparent to persons skilled in the art from a consideration of the following description when taken in conjunction with the drawing, wherein Fig. 1 shows a perspective view of the device illustrating the integers or compartments resulting in the use of removable partitions.

Figure 2:
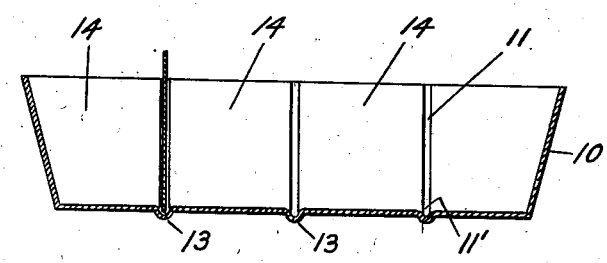
Figure 3:
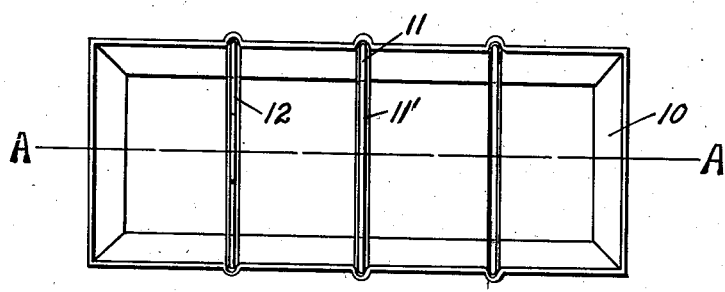

Fig. 2 is a cross sectional view of the device taken at the line AA of Fig. 3, and Fig. 3 shows a plan view of the device with a single partition interchangeable in the grooves or trenches provided.

Similar characters of reference indicate corresponding parts throughout the several views and referring now to the same character 10 indicates a pan or utensil constructed for baking or cooking purposes. The rectangular construction shown provides a bottom plate with vertically disposed ends and sides. The sides are provided with a plurality of grooves or trenches 11 spaced at regular intervals and the bottom is provided with similar grooves or trenches 11' correspondingly spaced with grooves 11.

There are partitions shown and characterized by the numeral 12 constructed to conform with the contour of the bottom and sides of the pan 10. These partitions 12 are interchangeable and engage the grooves 11 and 11' dividing the entire pan or utensil into a plurality of coherent sections 14, each one of which is adaptable for a distinctly separate article of food being prepared therein by the user.

A projecting member 12' constructed integral and as a part of the partition 12 serves the user as a means for engaging the partitions during the process of insertion or removal and makes it possible for the user to more readily remove the food portions when they are baked as a loaf which is the case when preparing bread, cake, puddings or the like.

The grooves or trenches 11' on the bottom of the pan being pressed outwardly as shown at 13, offer a means for elevating the pan or utensil from the floor of the oven causing the heat to circulate around the entire unit which aids in the baking operation.

The entire pan or utensil may be constructed of a single piece of material and the partitions being constructed of a shape and size to fit the device can also be produced with ease, making the unit a very economical and practical utensil that is positive in its operation and capable of producing the results for which it is intended.

While I have herein disclosed with particularity a single embodiment of my invention it will be manifest to persons skilled in the art that many changes in the general arrangement, form and configuration of the structure may be made without departing from the scope of the appended claims.

Having thus described my invention, what I claim and desire to secure by Letters Patent in the United States, is:

1. A cooking utensil comprising an open body having aligned grooves formed in its bottom and opposed side walls, a removable partition engaged in said grooves to the full depth of the body and dividing the latter into non-communicating compartments, and an integral portion thereof projecting from the top edge of the partition to act as a handle for facilitating the removal and replacement of the partition as required.

2. A cooking utensil comprising an open pan body having aligned outwardly pressed grooves formed in its bottom and opposed side walls, and a removable partition engaged in said grooves to divide the body into non-communicating compartments, the grooves in the bottom of said body elevating it from a heating surface.

3. A cooking utensil comprising an open pan body having aligned outwardly pressed grooves formed in its bottom and opposed side walls, a removable partition engaged in said grooves to divide the body into non-communicating compartments, and an integral portion thereof projecting from the top edge of the partition and above the plane of the top of the body to act as a handle for facilitating the removal of the partition as required, the grooves in the bottom of said body elevating it from a heating surface.

ALICE M. WATSON.